July 20, 1948.   C. FANSHIER   2,445,612
EXCESS FLOW VALVE
Filed March 23, 1945

CHESTER FANSHIER
INVENTOR.
BY Harry L. Yinger

Patented July 20, 1948

2,445,612

UNITED STATES PATENT OFFICE 2,445,612

EXCESS FLOW VALVE

Chester Fanshier, Bartlesville, Okla.

Application March 23, 1945, Serial No. 584,395

4 Claims. (Cl. 137—153)

1

The present invention relates to an excess flow valve structure placed in any passage or conduit through which fluid under pressure passes, for the purpose of shutting off or materially reducing flow of fluid under pressure if the passage or conduit or any portion thereof should break or leak or be opened to atmosphere or to lower pressure. More particularly, it relates to improvements in excess flow valve structure to be used in association with gauge tubes such as shown in the Frazier Patent 1,827,574 issued October 13, 1931, and also in loading, unloading or transfer lines from or to tanks handling a fluid under pressure.

In handling fluid under pressure, such as liquified petroleum gases, the pressures under which these fluids are handled are steadily increasing due to changing loading procedures. As pressures on the fluids have increased, ball and slug type check valves close more readily and needlessly under the increased pressure and present an annoyance. Chambers housing the ball have been increased in diameter in order to permit freer passage of the pressure fluid by the ball without the ball closing off, which helps to some extent but does not offer a complete solution to the problem. In present gauge tubes a small orifice is screwed into the top of the gauge tube to restrict the flow which in turn cuts down the pressure on the ball member to prevent needless closing of the ball type check valve. Operators insist on removing the orifice, which aggravates the problem and, even with the orifice, there is still a very definite problem present of the ball type valve closing when no emergency exists.

It is an object of the invention among others to provide an improved excess flow valve that won't inadvertently be closed by pressure fluid flow when no emergency exists; an improved excess flow valve that requires a pressure differential before being forced into a closed position as when an emergency exists; an excess flow valve that won't be actuated by small fluctuations in pressure within a container. An excess flow valve that is simple of design and easy to assemble; an excess flow valve economical in operation; and an excess flow valve durable in operation and requiring few replacement parts. Other objects will become apparent from a detailed description to follow in conjunction with the drawing.

In carrying out the objects of the invention, there is provided an excess flow valve structure having a body member through which a fluid under pressure flows. Within the body member is a conduit with a sliding member within the body member to control flow of fluid through the

2 conduit. Also within the body member is a closed chamber separated from the conduit by a portion of the sliding member and said sliding member, in the operation of the excess flow valve, being moved into a closed position across the conduit upon a sudden drop of pressure in the chamber by the pressure of fluid flowing through the conduit forcing the sliding member into sealing position across the conduit. Between the conduit and chamber is a small or slight opening, which can be a small hole drilled through a portion of the sliding member or a loose fit to provide a clearance between the portion of the sliding member and chamber wall to allow leakage of fluid under pressure from the conduit into the chamber to thus establish a balance of pressure between the chamber and conduit. The sliding member has an upper piston and a lower plunger with a rod connecting the two members. The upper piston separates the chamber and conduit while the lower plunger is adapted to contact a seal within the conduit to close off flow through the conduit. Into the top of the body member connect tube members, one connecting into the conduit while the other makes an extension of the chamber. These tubes may take the form of concentric tubes which may be rigid or flexible or may be a rigid or flexible tube having a central passage and a second tube formed by a series of passageways interconnected by labyrinth channels in the side wall of the tube member. Means are provided in one modification in the form of a spring to normally hold the sliding member in open relationship to the conduit. Means are provided for returning the sliding member to an open position after it has closed off the conduit and the threat of danger is no longer present which basically is a means for equalizing the pressure in the chamber and conduit. This may take the form of a slight score on the seat, a small hole through the lower plunger, from top to bottom or if positive action is desired, it may take the form of a manually operated valve which can be actuated from outside of the body member, to equalize pressure on each side of the piston.

The invention will be better understood from the following detailed description having reference to the accompanying drawings wherein like reference numerals have been used to represent like parts throughout the several views and which:

Figures 1, 2, 3, 4:
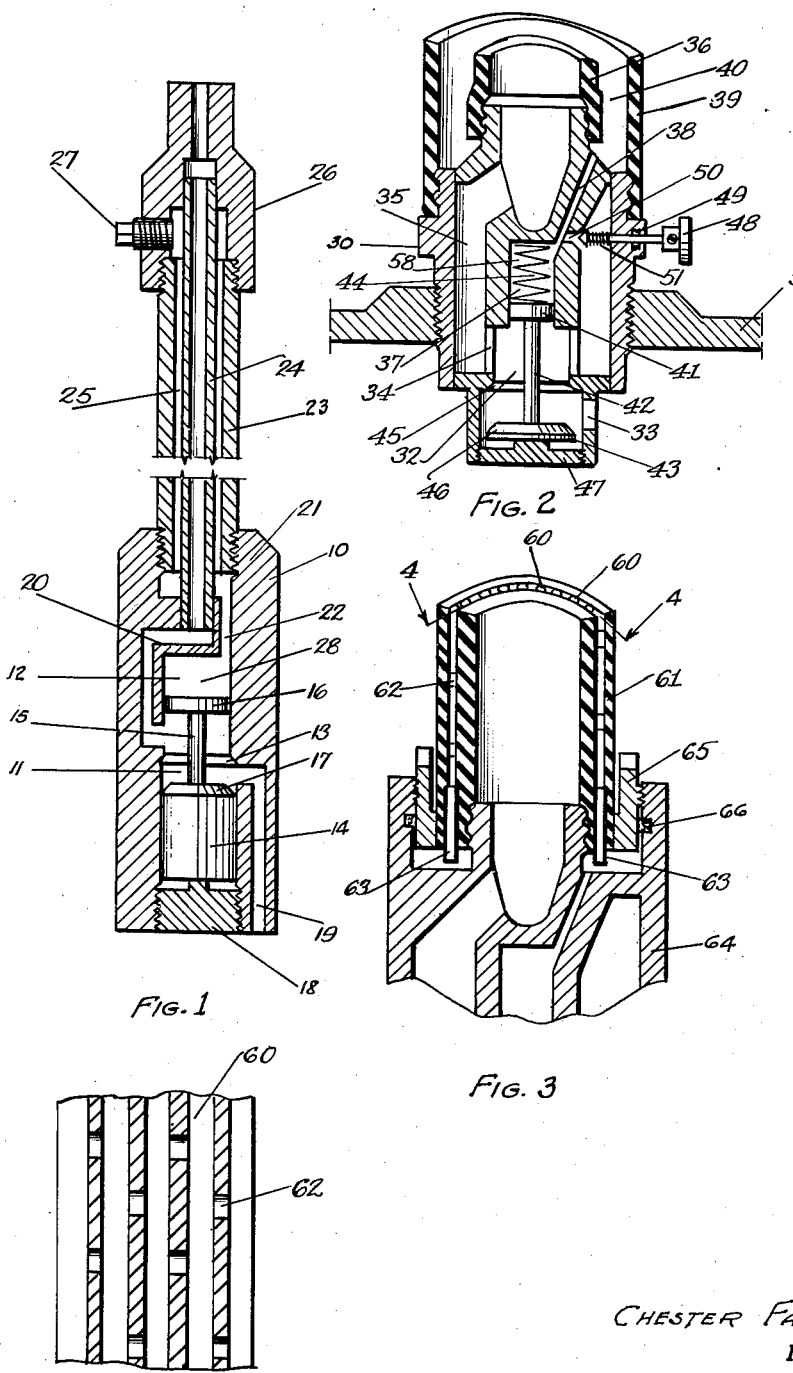
Figure 1 is a cross-sectional view of an excess-flow valve shown installed on the end of a gauge rod, which gauge rod is shown in cross-section and broken as to its length.
Figure 2 is a cross-sectional view of a modified form of excess-flow valve connected into the outlet of a tank and connected to an outlet line leading away from the tank.
Figure 3 is a cross-sectional view of a modified form of outlet or transfer line leading from a tank.
Figure 4 is a stretchout sectional view on the line 4—4 of Figure 3 showing labyrinth channels and connecting ports in the side wall of the outlet line.

Referring to the drawings, Figure 1 particularly, 10 represents a body member of an excess flow valve which body member has a central longitudinal passageway or bore of two diameters, the lower bore 11 being of a larger diameter than the upper bore 12. Between the upper bore 12 and the lower bore 11 is a seat 13, and reciprocable in the lower bore 11 is a plunger 14 which is loosely fitted within the bore 11. The plunger 14 is connected by rod 15 to a piston 16 which piston 16 is reciprocable in the upper bore 12. The plunger 14, rod 15 and piston 16 all combine to form a sliding member reciprocable within the body member 10. A portion 17 on the upper end of the plunger 14 engages the seat 13 when the plunger is moved upwardly providing a seal at this point. The plunger 14 is held from falling out of the body member 10 by plug 18 which also provides a means for removal of the sliding member for replacement or for inspection of the interior of the body member.

In the side wall of the lower portion of the body member 10 is a passageway 19 which extends upwardly and connects into that portion of the central passageway which forms the lower bore 11. On the opposite side, and above the first passageway, is a second passageway 20, the lower end of which connects into the central passageway in bore 11 and the upper end of passageway 20 connects with an outlet end 21 of the body member 10. The passageway 19, central passageway or bore 11 and passageway 20 combine to form a conduit through the body member extending substantially from one end of the body member to the other and flow through the conduit being controlled by the plunger member 14, when the sliding member is moved upwardly and the upper portion 17 on the top of the plunger 14 seats against the seat 13 to close off flow through the conduit.

The upper bore 12 forms a chamber 28 which connects with a passageway 22. In the modification shown in Figure 1, the excess flow valve is connected with a gauge rod such as disclosed in the Frazier Patent 1,827,574 issued October 13, 1931. The passageway 22 connects into an outer tube 23 of the gauge rod while an inner tube 24 connects with the passageway 20 and conducts normal flow through the excess flow valve through the gauge rod. The two tubes 23 and 24 are concentric leaving a space 25 therebetween which forms an extension of the chamber 28 formed in the bore 12. Any means may be provided for closing the upper end of space 25 and in Figure 1 a means is shown which comprises a coupling member 26 screwed on to tube 23 and a tight slip fit between the coupling 26 and the inner tube 24. In the coupling 26 is a screw plug 27 which may be removed to open space 25, passageway 22 and the chamber 28 in the bore 12 to the atmosphere for test purposes.

In normal operation of the structure as shown in Figure 1, the plunger 14 rests in lowered position against plug 18 and fluid under pressure flows through passage 19, into the central passageway at the top of bore 11 past seat 13 into the lower portion of bore 12 in the central passageway, then through passageway 20 into inner concentric tube 24, which flow may be controlled by a valve placed upon the upper end of coupling 26 (not shown), or whatever means of closure is used for space 25.

During the time the tank, in which the gauge tube of Figure 1 is installed, is being increased in pressure by the inflow of fluid under pressure as during loading, pressure will also increase in passageway 19, the central passageway in lower bore 11 above plunger 14 and in upper bore 12 below piston 16. Piston 16 is so constructed that there is a slight opening between the central passageway below the piston 16 and the central passageway above piston 16. This may take the form of a small hole drilled through piston 16 or may be as in Figure 1, a loose fit of the piston 16 within the bore 12, leaving enough space to allow a slight flow from the central passageway below the piston to the chamber 28 above piston 16. The small space or opening allows an equalizing flow of fluid under pressure to pass around or through the piston into chamber 28 above piston 16 in the bore 12, then into passageway 22 and space 25. The equalizing flow will continue, assuming screw plug 27 tightly in place, until the tank in which the gauge rod is present has reached its maximum pressure and until the pressure within space 25 has reached the pressure of the fluid in the central passageway below the piston 16. The buildup of pressure within the tank in which the gauge rod is placed and consequently in the central passageway below the piston 16 should be slow enough to permit the equalizing flow to maintain a differential of pressure which is not too great in the central passageway below piston 16 over that in the bore 12 above piston 16. If the differential becomes too great, the fluid under pressure in the central passageway below piston 16 will exert a force on the under side of the piston 16 sufficient to lift the piston upwardly, thus lifting plunger 14 along with it until the portion 17 seats on 13 to close off the conduit through the body member and thus close off normal flow. A proper balance of dimensions and weights must be established in order to affect correct working relations. Further, during the time of equalization, it is immaterial whether normal flow exists through the conduit or not.

As long as plunger 14 remains in the lowered position, normal flow is free to pass from the tank in which the gauge rod is placed, outward through the gauge tube, unless restricted by a control valve (not shown) on coupling 26. If plug 27 is removed or if breakage or an appreciable leak occurs in the outside tube 23 or its connecting means, fluid under pressure in space 25 is free to pass outward and the pressure in space 25, passageway 22 and chamber 28 in bore 12 above piston 16 is lowered suddenly. Then the equalizing flow around or through piston 16 being a restricted flow, is unable to maintain a balance of pressure on the opposite sides of piston 16, thus establishing a differential of pressure. When this occurs, pressure on the under side of piston 16 is great enough to lift the piston upwardly, thus carrying the plunger 14 upwardly until the portion 17 on the plunger contacts the seat 13, thus closing off normal flow through the conduit and further closing off flow by or through the piston 16. In this manner no great amount of fluid under pressure is allowed to escape to the atmosphere where an explosive mixture would be formed with the hazard of an explosion occurring. It can therefore be seen the excess flow valve operates when an emergency occurs to avert serious accidents and that the sliding member is moved into a closed position across the conduit upon a sudden drop of pressure in the chamber by the pressure of fluid flowing through the conduit forcing the sliding member into sealing position across the conduit.

When the emergency has passed, as by repairing the break or placing a new tube into place for tube 23 or by replacing plug 27, normal flow through the excess flow valve is desired. This means that plunger 14 must be lowered, thus breaking the seal between the portion 17 and seat 13. A slight score may be provided in seat 13 or portion 17 on plunger 14, to allow a restricted leakage through the seal to again equalize pressure on opposite sides of piston 16. As an alternative, a small hole through the lower portion, from top to bottom of plunger 14 could be employed to equalize the pressure on opposite sides of the seat 13.

Figure 2 shows another modification of the excess flow valve with one main point of difference over Figure 1 being a manually operated valve member, operable from exteriorly of the excess flow valve, to quickly and readily equalize pressure on the opposite sides of a piston member. A further difference over Figure 1 is that the excess flow valve is shown as used with unloading, loading or transfer lines, wherein the line is flexible.

A body member 30 is disclosed attached into a tank 31, as by screw threading and said body member has a central longitudinal passageway 32, through the lower end thereof. Opening 33 in the body member connects the interior of tank 31 with the central longitudinal passageway 32 while opening 34 connects the central passageway 32 with passageway 35 which in turn connects with inner flexible tubing 36. The opening 33, central passageway 32, opening 34 and passageway 35 form a conduit through the body member which maintains normal flow through the excess flow valve structure.

Within the body member 30 and near the center thereof is a bore 37, the top of which connects with a passageway 38. Connected to the upper portion of the body member 30 is a flexible tube 39, concentric with the tube 36 and surrounding said tube 36 so as to leave a space 40 between the tubes 36 and 39. The bore 37 has slidably mounted therein a piston 41, which piston 41 connects by rod 42 with a plunger 43. It is noted that the plunger 43 in Figure 2 is of smaller size, hence of less weight than the plunger of Figure 1, and spring 44 is employed in Figure 2 to insure that the plunger 43 is held in its downward position. Here again the plunger 43, rod 42 and piston 41 make a slidable member within the body member. In the central passageway is a seat 45 and on the plunger 43 is a portion 46, which portion 46 contacts seat 45 when the sliding member moves upwardly in order to close off the conduit through the body member just as explained for Figure 1. Closure 47 in the bottom of the body member is removable just as plug 18 is removable in Figure 1 for the same purpose.

The bore 37 above piston 41 has chamber 58 which chamber has extensions formed by passageway 38 and space 40 to provide a space for pressure fluid flow just as in Figure 1 and a space is provided between piston 41 and bore 37 to allow equalizing flow. The space may be provided by having the piston loosely fit in the bore 37, as in Figure 1, but this means has not been found as desirable in the structure of Figure 2 as a small opening drilled through the piston 41, or a manually operable opening. The operation of the structure of Figure 2 is similar to Figure 1 except that a manually operated valve 48, having a packing 49 in the body wall 30, normally closes opening 50 leading into passageway 38. When the plunger 43 is against seat 45, closing off the conduit in an emergency, and repairs have been made, it is desired to reset the excess flow valve. Manually operated valve 48 is pulled outwardly against spring 51, thus uncovering opening 50 and allowing pressure to equalize on each side of piston 41 while spring 44 forces the sliding member downwardly, thus unseating plunger 43 from seat 45 to re-establish normal flow through the conduit.

Figure 2 does not show means of closing space 40 between inner and outer flexible tubes 36 and 39 beyond the ends, which are attached to the body member. It may be done by any well known means for attaching flexible hose, or similar in effect to the means shown in Figure 1 except that with flexible tubes, a slip fit of the inner tube would not be desirable and a more positive means should be employed.

Where excess flow valves are incorporated in a flow line, means must be provided for transferring the equalized pressure from space 40 to the comparable space in any extensions of the line past the valve. Such valves in the flow line may, if desired, be provided with double walls, in which case space 40 can be so connected as to be continuous with comparable chambers in the valve and in extension connections beyond in the valve. Any number of extensions and any number of valves or other fittings may be provided and will not cause the excess flow valve to become inoperable, unless such length of line or restrictions of space 40 within valves or connections be introduced, that sufficient resistance to flow along space 40 is set up that an operable pressure equalization cannot be established between chamber 58 above, and passage 32 below piston 41.

Figure 3 shows a different arrangement for providing a double wall in transfer tubes. A series of closely adjacent passageways or labyrinth channels 60 are provided extending longitudinally of tube 61 with each channel connected to its neighboring channel on each side with a series of connecting ports 62, thus providing a free flow of fluid, and consequently of pressure build-up, throughout the entire labyrinthian structure. Small metal or hard plastic tubes 63 of short length are inserted in all or many of the passageways at the end of the tube where it joins the connection or body member 64 to prevent crushing and closing of the longitudinal channels by pressure of a binding clamp such as a tapered nut 65 as shown in Figure 3, and having a seal 66 between the tapered nut 65 and body member 64. Any means of clamping may be used to clamp the tube to the valve body member just so an effective seal is provided between the tube and body member. The present structure can be incorporated in flexible molded tubes, such as rubber or plastic tubes and can also be incorporated in metallic tubes.

While the invention has been described in connection with several specific embodiments, it is to be understood that the words which have been used are words of description rather than of

I claim:

1. An excess flow valve structure through which a fluid under pressure flows comprising a body member, a conduit within the body member, a sliding member within the body member controlling flow of fluid under pressure through the conduit, a closed chamber within the body member separated from the conduit by a portion of the sliding member, concentric tubes connecting into the upper end of the body member, the inner tube of the concentric tubes connecting into the conduit to conduct normal flow of fluid under pressure away from the valve structure while the outer tube connects into the chamber and forms an extension of the chamber and said sliding member being moved into a closed position across the conduit upon a sudden drop of pressure in the chamber due to a break or leak in the outer tube by the pressure of fluid flowing through the conduit forcing the sliding member into sealing position across the conduit.

2. An excess flow valve structure through which a fluid under pressure flows comprising a body member a conduit within the body member, a sliding member within the body member controlling flow of fluid under pressure through the conduit, a closed chamber within the body member separated from the conduit by a portion of the sliding member, flexible concentric tubes connecting with the upper end of the body member, the inner flexible tube connecting into the conduit to conduct normal flow of fluid under pressure away from the valve structure while the outer flexible tube connects into the chamber and forms an extension of the chamber and said sliding member being moved into a closed position across the conduit upon a sudden drop of pressure in the chamber due to a break in the outer flexible tubing by the pressure of fluid flowing through the conduit forcing the sliding member into sealing position across the conduit.

3. An excess flow valve structure through which a fluid under pressure flows comprising a body member, a conduit within the body member, a sliding member within the body member controlling flow of fluid under pressure through the conduit, a closed chamber within the body member separated from the conduit by a portion of the sliding member, a tube member connecting into the upper end of the body member conducting normal flow of fluid under pressure away from the valve structure, a second tube formed by a series of labyrinth channels interconnected by ports all located in the side wall of the first mentioned tube member connecting into the chamber and forming an extension of the chamber, and said sliding member being moved into a closed position across the conduit upon a sudden drop of pressure in the chamber due to a break or leak in the tube member by the pressure of fluid flowing through the conduit forcing the sliding member into sealing position across the conduit.

4. An excess flow valve structure through which a fluid under pressure flows comprising a body member, a sliding member within the body member controlling flow of fluid under pressure through the conduit, a closed chamber within the body member separated from the conduit by a portion of the sliding member, said sliding member being moved into closed position across the conduit upon a sudden drop of pressure in the chamber due to a leak from the chamber by the pressure of fluid flowing through the conduit forcing the sliding member into sealing position across the conduit, a communication between the chamber and conduit normally closed by a valve member, and said valve member being accessible from exterior of the body member to open communication between the chamber and conduit to equalize pressure in the chamber and conduit with the sliding member returning to open position with relation to the conduit.

CHESTER FANSHIER.

REFERENCES CITED

The following references are of record in the file of this patent:

UNITED STATES PATENTS

| Number | Name | Date |
|---|---|---|
| 1,250,388 | Titus | Dec. 18, 1917 |
| 1,950,728 | Heaney | Mar. 13, 1934 |
| 2,016,229 | Dight | Oct. 1, 1935 |
| 2,047,403 | Beck | July 14, 1936 |
| 2,172,345 | Bucknell | Sept. 12, 1939 |